United States Patent
Al et al.

(10) Patent No.: US 9,954,909 B2
(45) Date of Patent: Apr. 24, 2018

(54) SYSTEM AND ASSOCIATED METHODOLOGY FOR ENHANCING COMMUNICATION SESSIONS BETWEEN MULTIPLE USERS

(71) Applicant: CISCO TECHNOLOGY, INC., San Jose, CA (US)

(72) Inventors: Smiling Al, Suzhou (CN); David Ye, Suzhou (CN); Jin Li, Suzhou (CN)

(73) Assignee: Cisco Technology, Inc., San Jose, CA (US)

( * ) Notice: Subject to any disclaimer, the term of this patent is extended or adjusted under 35 U.S.C. 154(b) by 501 days.

(21) Appl. No.: 14/011,489

(22) Filed: Aug. 27, 2013

(65) Prior Publication Data

US 2015/0067023 A1    Mar. 5, 2015

(51) Int. Cl.
*G06F 15/16* (2006.01)
*H04L 29/06* (2006.01)

(52) U.S. Cl.
CPC .......... *H04L 65/403* (2013.01); *H04L 65/605* (2013.01)

(58) Field of Classification Search
CPC ............... H04L 29/08072; H04L 29/06; H04L 29/0809; H04L 29/06047; G06Q 30/02; H04N 7/147; H04N 21/44008; H04N 21/4316
USPC .............................. 709/203; 348/14.08, 14.1
See application file for complete search history.

(56) References Cited

U.S. PATENT DOCUMENTS

| | | | |
|---|---|---|---|
| 5,940,118 A | 8/1999 | Van Schyndel | |
| 7,464,262 B2 | 12/2008 | Ferren et al. | |
| 7,707,247 B2 | 4/2010 | Dunn et al. | |
| 8,170,241 B2 | 5/2012 | Roe et al. | |
| 8,237,765 B2 * | 8/2012 | King | H04N 7/152 348/14.01 |
| 8,253,770 B2 | 8/2012 | Kurtz et al. | |
| 8,289,362 B2 | 10/2012 | Baird | |
| 8,379,075 B2 | 2/2013 | Hagen | |
| 2003/0072460 A1 | 4/2003 | Gonopoiskiy et al. | |
| 2005/0243168 A1 * | 11/2005 | Cutler | H04N 7/147 348/14.12 |
| 2006/0251384 A1 * | 11/2006 | Vronay | G11B 27/034 386/242 |
| 2007/0188597 A1 * | 8/2007 | Kenoyer | H04N 7/147 348/14.08 |
| 2008/0273078 A1 | 11/2008 | Grasley et al. | |
| 2009/0123035 A1 * | 5/2009 | Khouri | G06K 9/00771 382/115 |
| 2009/0141988 A1 * | 6/2009 | Kovtun | G06F 17/30793 382/225 |
| 2009/0231438 A1 | 9/2009 | Srivastava et al. | |
| 2010/0214391 A1 | 8/2010 | Graham et al. | |
| 2010/0228825 A1 * | 9/2010 | Hegde | G06F 21/6218 709/204 |

(Continued)

FOREIGN PATENT DOCUMENTS

EP      2 352 290 A1    8/2011

*Primary Examiner* — Joseph E Avellino
*Assistant Examiner* — Patrick Ngankam (57) ABSTRACT

In one embodiment, a video frame is received from an external source, one or more users are extracted from the video frame, and user attendee data is generated based on the one or more extracted users and stored in a database. The user attendee data and video frame are transmitted to the client device and a communication session of the client device is updated based on the video frame and attendee data.

17 Claims, 8 Drawing Sheets

(56) References Cited

U.S. PATENT DOCUMENTS

| | | |
|---|---|---|
| 2010/0245536 A1 | 9/2010 | Huitema et al. |
| 2010/0321465 A1 | 12/2010 | Behrens |
| 2011/0012988 A1 | 1/2011 | Gorzynski et al. |
| 2011/0023063 A1* | 1/2011 | McDonough ...... H04N 21/4316 725/46 |
| 2011/0071862 A1 | 3/2011 | Cator et al. |
| 2011/0113011 A1 | 5/2011 | Prorock et al. |
| 2011/0270922 A1 | 11/2011 | Jones et al. |
| 2012/0136571 A1 | 5/2012 | Simon et al. |
| 2012/0242778 A1 | 9/2012 | Ayers |
| 2012/0324528 A1 | 12/2012 | Malegaonkar et al. |
| 2013/0002794 A1 | 1/2013 | Hines et al. |
| 2013/0035790 A1 | 2/2013 | Oliver, III et al. |
| 2013/0120522 A1 | 5/2013 | Lian et al. |

* cited by examiner

| ATTENDEE # | IMAGE | TP ROOM | USER NAME | LOCATION | ADDRESS | FRAME VALUE | CURRENT SPEAKER |
|---|---|---|---|---|---|---|---|
| 1 | :) | 1 | Abe | <XX, XX> | USA | 2389 | 0 |
| 2 | :) | 1 | Beau | <XX, XX> | USA | 2389 | 0 |
| 3 | :) | 1 | Corey | <XX, XX> | USA | 2389 | 0 |
| 4 | :) | 1 | Derek | <XX, XX> | USA | 2389 | 0 |
| 5 | :) | 1 | Edward | <65, 50> <80, 35> | USA | 2389 | 0 |
| 6 | :) | 1 | Fred | <70, 65> <90, 50> | USA | 2389 | 0 |
| 7 | :) | 1 | George | <XX, XX> | USA | 2389 | 1 |
| 8 | :) | WebEx | Henry | <XX, XX> | CHINA | 2390 | 0 |

SYSTEM AND ASSOCIATED METHODOLOGY FOR ENHANCING COMMUNICATION SESSIONS BETWEEN MULTIPLE USERS

The present disclosure relates generally to a system and associated method that enables group users to be individually identified in an online communication session based on video data containing multiple users.

BACKGROUND

With the widespread proliferation of Internet usage in recent years leading to global communications, the use of telecommunications has become increasingly important. Specifically, companies and individuals wishing to connect with each other can do so via video teleconferencing thereby allowing users to hold meetings as if they were talking in the same room. These meetings can be held using a variety of software and hardware setups. For example, some teleconferences may entail the use of an entire room having a plurality of cameras, screens and microphones enabling a high capacity meeting. However, other software enables the use of teleconferencing between individuals or small groups via the use of a camera and microphone connected to a single computing device.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF EXAMPLE EMBODIMENTS

Overview

In one embodiment, a video frame is received from an external source, one or more users are extracted from the video frame, and user attendee data is generated based on the one or more extracted users and stored in a database. The user attendee data and video frame are transmitted to the client device and a communication session of the client device is updated based on the video frame and attendee data.

Referring now to the drawings, wherein like reference numerals designate identical or corresponding parts throughout the several views.

Figure 1:
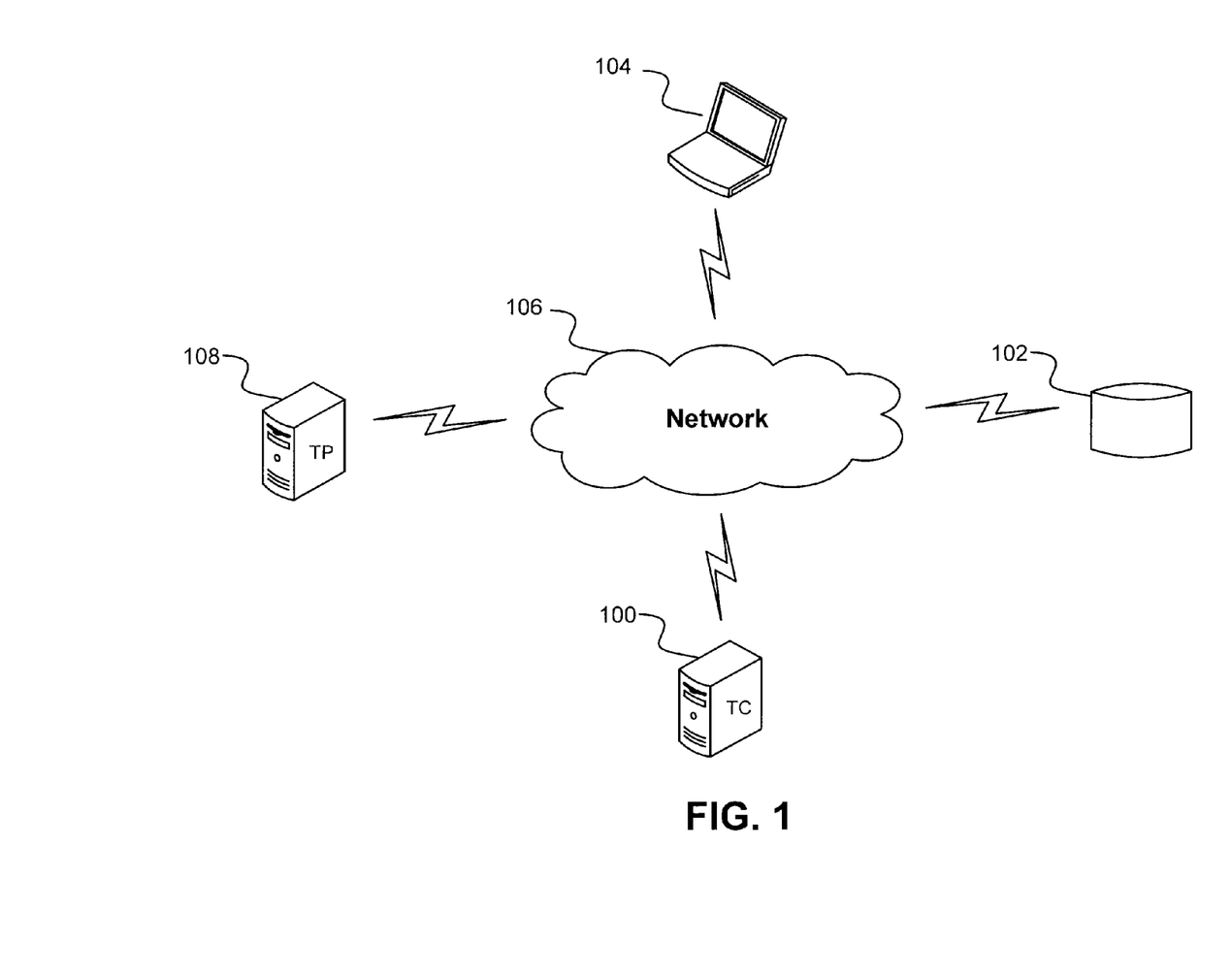
FIG. 1 illustrates an exemplary system according to one example.

FIG. 1 illustrates an exemplary system according to one example. In FIG. 1, a system server 100 is connected to a client device 104, a database 102 and a telecommunications server 108 via network 106. Client device 104 is connected to the system server 100, the database 102 and the telecommunications server 108 via the network 106. Similarly, the database 102 is connected to the client device 104, the telecommunications server 108, and the system server 100 via the network 106. It is understood that the system server 100, the telecommunications server 108, database 102 may represent one or more servers and databases, respectively. In other selected embodiments, the database 102 may be part of the system server 100 or external to the system server 100.

The client device 104 represents one or more computing devices, such as a smart phone, tablet, or personal computer, having at least processing, storing, communication and display capabilities as would be understood by one of ordinary skill in the art. The telecommunications server 108 represents a server for providing teleconferencing capabilities as would be understood by one of ordinary skill in the art. The database 102 represents any type of internal or external storage provided as part of the system server 100 or provided in the cloud as part of a server farm as would be understood by one of ordinary skill in the art. The network 106 represents any type of network, such as Local Area Network (LAN), Wide Area Network (WAN), intranet and Internet.

In selected embodiments, a user of the client device 104 may wish to communicate with other users via a teleconference system, such as system server 100, having video and/or audio capabilities over the network 106. For example, Cisco System's, Inc.™ WebEx™ Web Conferencing system provides particular teleconferencing capabilities to remote users in a variety of locations and may represent the system server 100 in an exemplary embodiment. Using the WebEx™ system, a user in the United States can have a video meeting online with a user in Norway and a user in Italy. Each user in the meeting may be identified and displayed as a separate attendee in the meeting so that a group of attendees can easily be determined and organized. Speaking users may also be identified by assigning a particular symbol next to a picture of identification information of a user who is speaking. Speaking users may also be displayed more prominently or at a particular location with respect to other meeting attendees. As more attendees join the meeting, they are newly added and attendee data is updated with the new user information so that other users will be aware of the new attendees. Therefore, a plurality of individual users can easily communicate with each other via the teleconferencing services provided by the WebEx™ system or other systems of a similar type.

Another type of teleconferencing, such as via a telepresence session, can also be used for online communications. Telepresence utilizes dedicated hardware to provide a high-quality video and audio conference between two or more participants. For example, Cisco System's, Inc.™ TelePresence System TX9000™ and 3000™ series provides an endpoint at the location at which a plurality of users in a single room can communicate with others at various locations. For instance, the TX9000™ systems is capable of delivering three simultaneous 1080p60 video streams and one high-definition, full-motion content-sharing stream.

With these systems, an office or entire room are dedicated to providing teleconferencing capabilities for a large group of people.

In one scenario, a meeting or communication session may have been organized between individuals each from a different company as well as a group of users from the same company. In this instance, each individual user joining a teleconference meeting, such as via WebEx™, will be represented on an individual video feed and displayed individually within the meeting. However, the group of users from the same company may be located in the same room using a telepresence system. As such, the entire room may be represented as an individual video feed thereby representing the entire room as a single attendee within the teleconference meeting. Therefore, as described further herein, the system server 100 in selected embodiments advantageously provides the ability to extract individual users from a telepresence video feed, or feed containing multiple users, and to individually represent these users in the teleeconferencing communication session.

Figure 2:
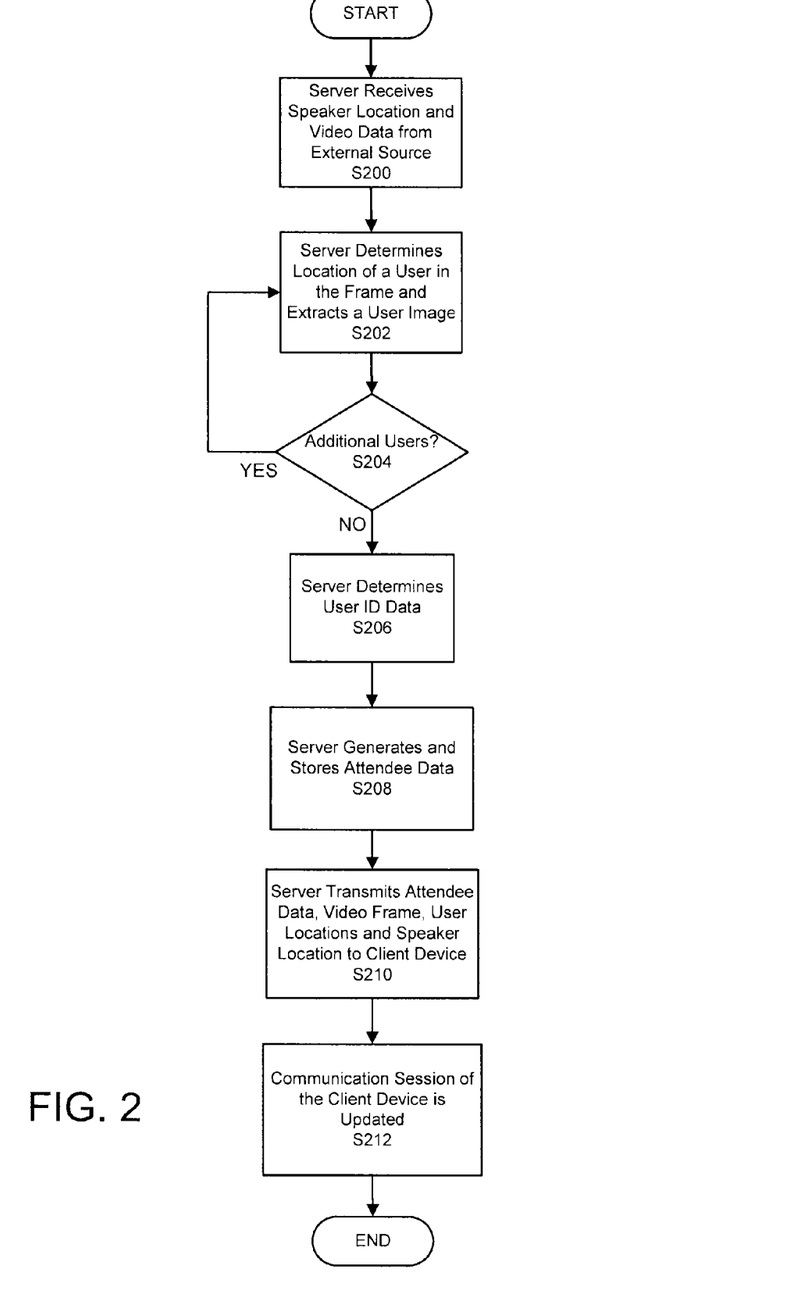
FIG. 2 illustrates an exemplary method for updating a communication session according to one example.

FIG. 2 illustrates an exemplary method for updating a communication session according to one example. FIG. 2 provides an exemplary method performed by the system server 100 when video is received from an external source such as the telecommunications server 108. In selected embodiments, the system server 100 may be one or more servers of a teleconferencing system, such as WebEx™, whereas the telecommunications server 108 may be one or more servers of a telepresence system such as TX9000™. When users of the telecommunications server 108 wish to join a teleconference hosted by the system server 100, the video stream from the telecommunications server 108 is transmitted to the system server 100. Accordingly, the system server 100 receives the video data at step S200. In selected embodiments, the system server 100 also receives a speaker location from the telecommunications server 108 which identifies a location at which sound is coming from within the video frame. For example, various microphone arrays may be located throughout the endpoint meeting location of users of the TX9000™ system. Through signal processing to identify which microphone is best receiving the sound and other various triangulation techniques and video processing techniques as would be understood by one of ordinary skill in the art, the telecommunications server can determine the location within the frame at which it is most likely sound is coming from.

Figure 3A:
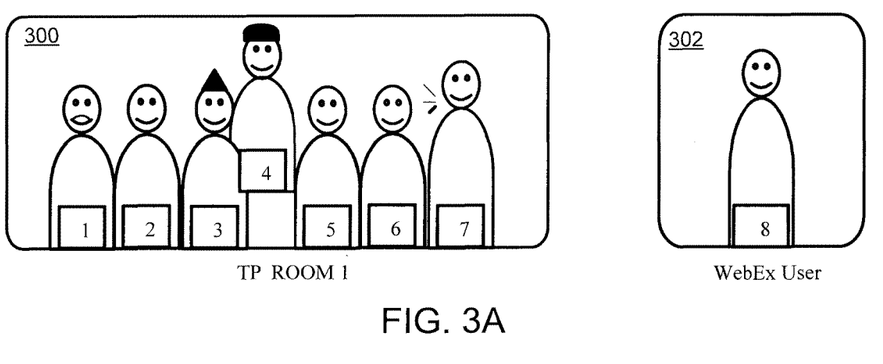
FIG. 3A illustrates exemplary video frames according to one example.

Once the system server 100 receives the video data from the telecommunications server 108, the system server 100 can, at step S202 and on a frame by frame basis, determine the location of users within the frame and extract user images from the frame. These users can then be represented by the system server 100 as individual attendees of the teleconference meeting. FIG. 3A illustrates exemplary video data processed by the system server 100. Video frame 300 illustrates a frame from a video stream received from the telecommunications server 108 for seven users in the same telepresence room which is identified by the system server 100 as Telepresence Room 1. Video frame 302 illustrates exemplary video data of a user of the teleconferencing system hosted by the system server 100. As illustrated in FIG. 3A, video frame 300 contains seven users within the same frame thereby representing that the seven users are in the same room and using another teleconference system such as telepresence system.

In order to extract user images, the system server 100 must determine the locations of each individual user within the frame and particularly the location of the face of each user as this is what will be displayed in the teleconference meeting room. Of course, any portion of each user may be extracted and displayed by the system server 100. As such, the system server 100 may scan the video frame to determine the location of users based on known human features such as ears, eyes, nose and a mouth. The shape of these features may be utilized by system server 100 to determine the location of a face. Further, predetermined color tones of human skin can be utilized by the system server 100 to identify which part of the video frame contains a user. Once a certain portion of the video frame has been identified as containing a user, the system server 100 may determine a contour of the entire user based on a comparison to the background of the video frame and predetermined or known colors and shapes of the background.

Figure 3B:
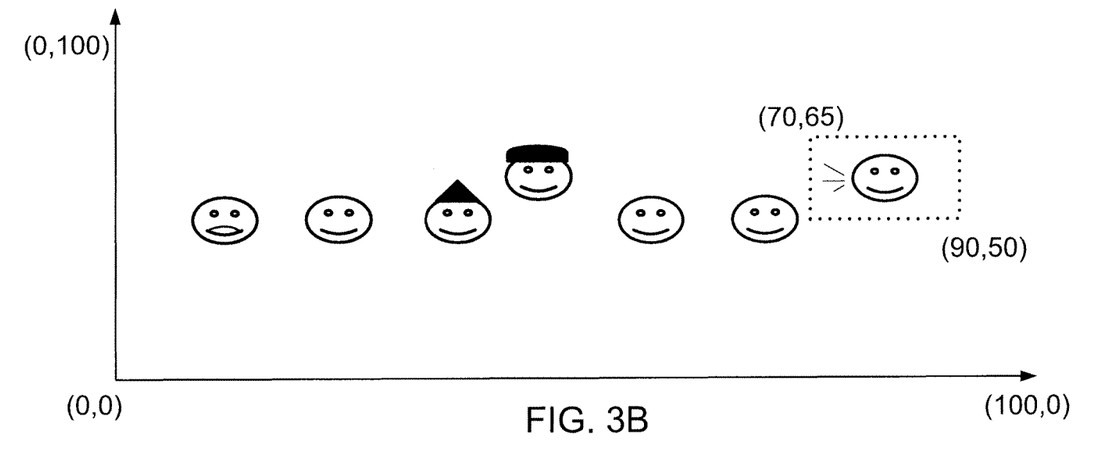
FIG. 3B illustrates an extraction process according to one example.

FIG. 3B illustrates an extraction process according to one example. As illustrated in FIG. 3B, the system server 100 has identified the location of each user with the video frame 300. At this point, the system server 100 identifies a predetermined or manually determined portion surrounding the face of the user for extraction. In other words, the system server 100 identifies a set of coordinates in the video frame from which to extract a portion of the video frame. These coordinates may also be determined so as to minimize interference or overlap between various users within the video frame. In FIG. 3B, the system server 100 has identified a location of the seventh users within the video frame 300 of Telepresence Room 1 and has determined coordinates within the frame of (70, 65) and (90, 50) of which to extract from the frame.

It should also be noted from FIG. 3B, that the system server 100 can identify the location of the active speaker within the video stream from the telecommunications server 108 based on the speaker location information received from the telecommunications server 108 as described previously herein. As illustrated in FIG. 3B and based on the speaker location information received from the telecommunications server 108, the system server 100 can identify the seventh user in the room as being the actively speaking user. This information can then be used by the system server 100 to display this user more prominently or in a certain order within the teleconference meeting room as described previously and further herein.

Referring back to step S202 of FIG. 2 and with respect to FIG. 3, once a user is extracted from the video frame 300, the system server 100 determines whether there are additional users to be extracted at step S204. If so, the system server 100 performs the above-noted processing with respect to step S202. Otherwise, the system server 100 proceeds to step S206.

In step S206, the system server 100 uses facial recognition processing as would be understood by one of ordinary skill in the art to determine user information based on the user faces extracted in step S202. Specifically, the system server 100 searches an internal database or database 102 to identify user identification information based the extracted faces. In selected embodiments, user identification can include a user's name, nickname, email address, address, telephone number or any other identification information as would be understood by one of ordinary skill in the art. In the event that user information cannot be determined based on an extracted face, the system server 100 auto-generates identification information of the extracted user such as "Guest_X" or "User_X" where X is a number, letter or symbol distinguishing the unidentified user from other users. To further identify the relationship of the unidentified user to others in the meeting room, the system server 100 may also auto-generate identification information including the location of the unidentified user. For example, the system may designate the room of the unidentified user or may auto-generate a user name such as "TP_Room_1_Guest_1." Further, the system server 100 may auto-generate common identification information, such as address information, based on users from the same video feed. Once user identification information is determined for each user, the process proceeds to step S208 in which the server system 100 generates and stores user attendee data.

Figure 4:
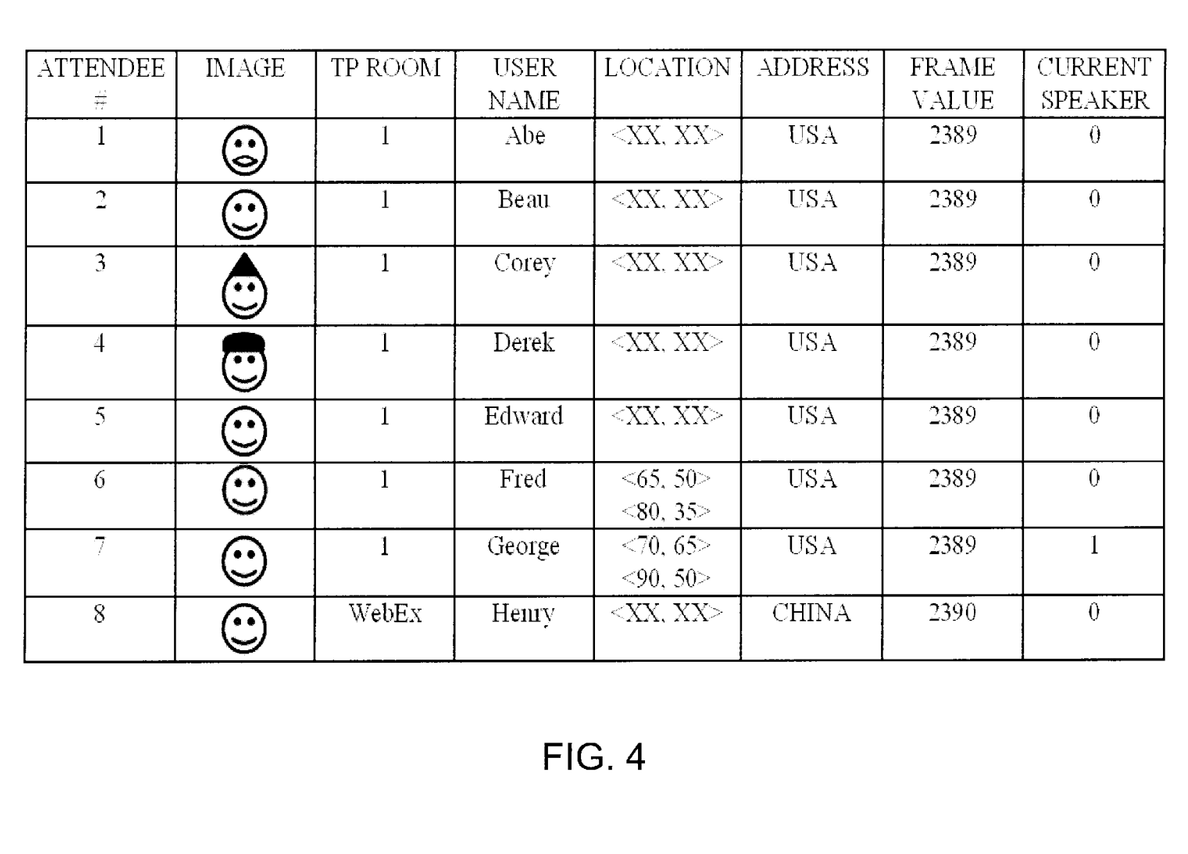
FIG. 4 illustrates user attendee data according to one example.

In step S208, the system server 100 stores internally or within database 102 the user image, user name, user location within the video frame, user address, an indication of who the current speaker is within the teleconference meeting, and a corresponding teleconference designation. Therefore, the system server 100 stores attendee information for each user included in the teleconference meeting. For users that could not be specifically identified in step S206, the system server 100 stores internally or within database 102 the auto-generated identification information such as the image, room, name and address. FIG. 4 provides an illustrative example according to one exemplary embodiment of user attendee data. As illustrated in FIG. 4, the system server 100 has designated eight users as being part of the teleconference meeting. Seven users were identified based on the video stream provided from the telecommunications server 108 having a group of users in the same room and a single user that is a member of the teleconference system being hosted by the system server 100. For example, the seven users may be sending information via telepresence system such as TX9000™ to a teleconferencing system such as WebEx™ that has a member eight present within the meeting. The attendee information illustrated in FIG. 4 further identifies that users one through seven are from Telepresence Room 1 whereas the eighth user is on WebEx™.

Names and addresses of each user are also identified thereby indicating that the teleconference meeting is between users at a single entity within the United States of America and an individual within an entity in China. As illustrated in FIGS. 3A and 3B, and based on the speaker location information received from the telecommunications server 108, the attendee information illustrated in FIG. 4 also includes an active tag or binary value of "1" representing that the speaking user is George. Other designations may also be used to indicated the speaking user.

Referring back to FIG. 2, once the system server 100 has generated and stored the attendee meeting information for the teleconference meeting, the system server 100 transmits at step S210 the video frame, user locations, speaker location and at least a portion of the user attendee data to the client devices 104 connected to the teleconference meeting hosted by the system server 100. The client devices 104 then receive this information at step S212 such that the communication session is updated accordingly based on this information. In other words, the client devices 104 that are part of the teleconference meeting receive the video frame 302 and video frame 300 as well as user locations within the video frame 300. Users are then extracted from the video frame 300 based on the user locations to identify a plurality of user images. These images are then displayed via the client devices 104 to attendees of the teleconference meeting as separate attendees within the meeting. Further, the client devices 104 may display user identification information for corresponding users based on the attendee meeting information received from the system server 100. Additionally, the speaker location information may be used to determine who the active speaker is by comparing the speaker location to the user locations and determining which user is closest. Alternatively, the attendee data may be used by the client devices 104 to determine who the speaking member is within the communication session.

In other selected embodiments, the server system 100 may process the video frame data along with user location information and attendee meeting information all of the processing is performed on the server system 100 side rather than on the client devices 104 themselves. Information determined from this processing can then be used to update the communication session running on the server system 100 and the updated communication session information can be pushed to the client devices 104 for display and interaction. Further, as illustrated in FIG. 4, the system server 100 may determine who is the active speaker based on the speaker location information and user location information and store this information as part of the attendee meeting information. Accordingly, in selected embodiments, the system server 100 may send to client devices 104 updated communication session information having individual video feed information for each extracted user along with user attendee data identifying the individual users and the speaking user.

Figure 5:
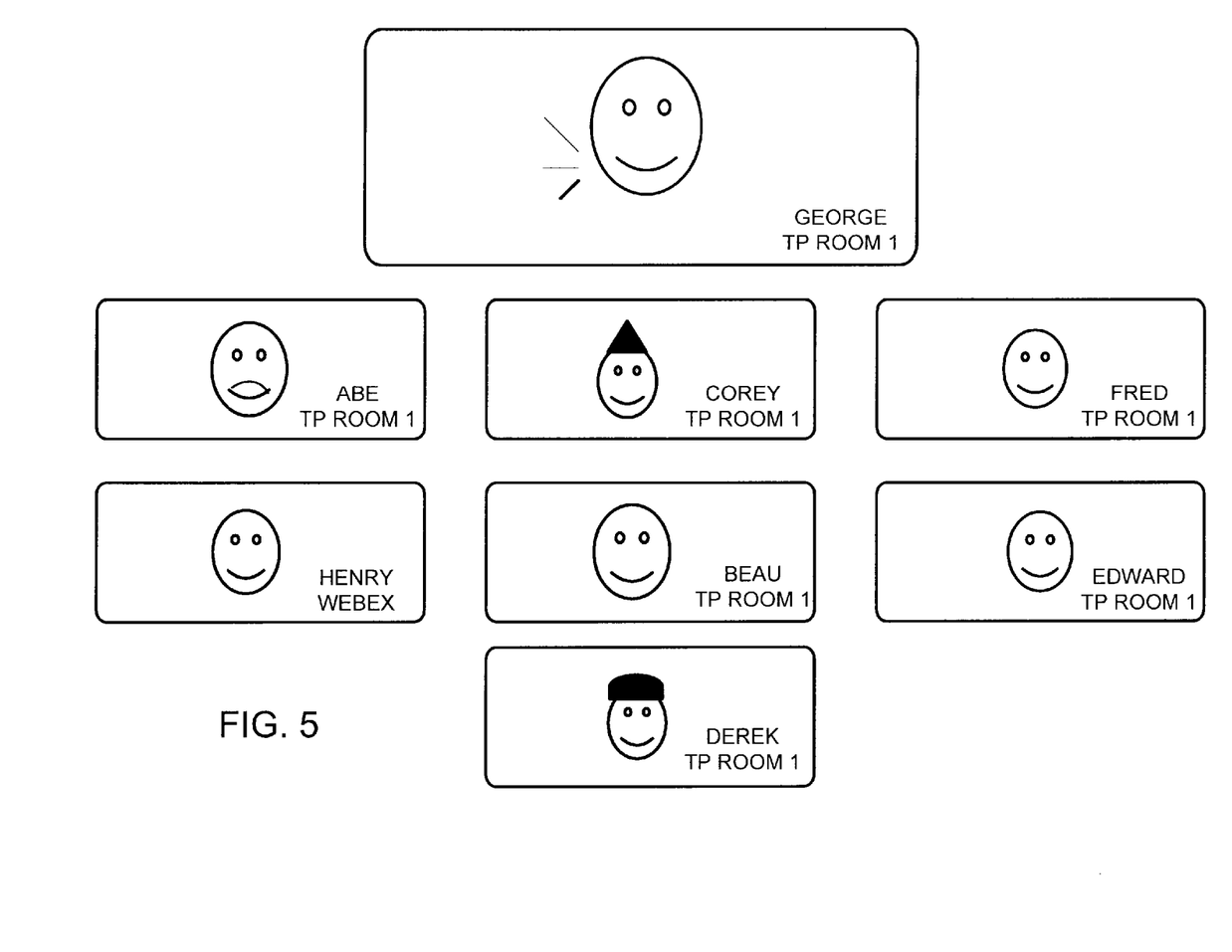
FIG. 5 illustrates an exemplary display of a communication session according to one example.

FIG. 5 illustrates an exemplary display of an updated communication session according to one example. As illustrated in FIG. 5, once the communication session has been updated, each user from the video frame having a plurality of users is separately identified in the teleconferencing session as if they were all separate participants. In other words, each user extracted is provided in a separate video feed of the teleconferencing session along with user 8 (Henry) who was originally part of the teleconferencing session. Each user video window may also be provided with a user name and location based on the attendee data determined in steps S206 and S208. Further, using the speaker location information included in the attendee data, speaking user 7 (George) may be prominently displayed in the communication session window to clearly identify who is speaking. Therefore, as the communication session is updated with additional attendee data based on additional streams of data received locally to the system server 100 or externally from the telecommunications server 108, the communication session illustrated in FIG. 5 may be changed to accommodate different users who are speaking, new users to the communication session, and users leaving the communication session. The communication session may also be further updated based on factors such as who hosted the meeting, who is running the meeting, occupation title priority, a predetermined priority or based on idle time vs. speaking time.

The system server 100 described herein provides, in selected embodiments, a variety of advantages when performing teleconferencing sessions having a plurality of meeting attendees. For example, users on a teleconferencing system, such as WebEx™, will have a difficult time conversing online with a single video stream containing a plurality of users from a telepresence stream generated by a system such as TX9000™. As the video streams are often displayed in a small portion of the screen due to screen sharing and other size limitations, attendees in the meeting may get confused as to who is actually part of the meeting or who is speaking based on a small video feed containing a group of attendees at a single facility. Further, it may be difficult to effectively provide identification information for each member of the group based on the size of the group video stream. Therefore, by having each user of the group individually extracted and listed as a separate attendee of the teleconference meeting with corresponding identification information, other members of the teleconference meeting can more easily identify these users and feel as though they are in a real world conversation. Further, with individually determined attendee members, the system server 100 may more easily organize the members based on a variety of information such as who is actively speaking, who is hosting the meeting, and who has been idle or left the meeting.

Figure 6:
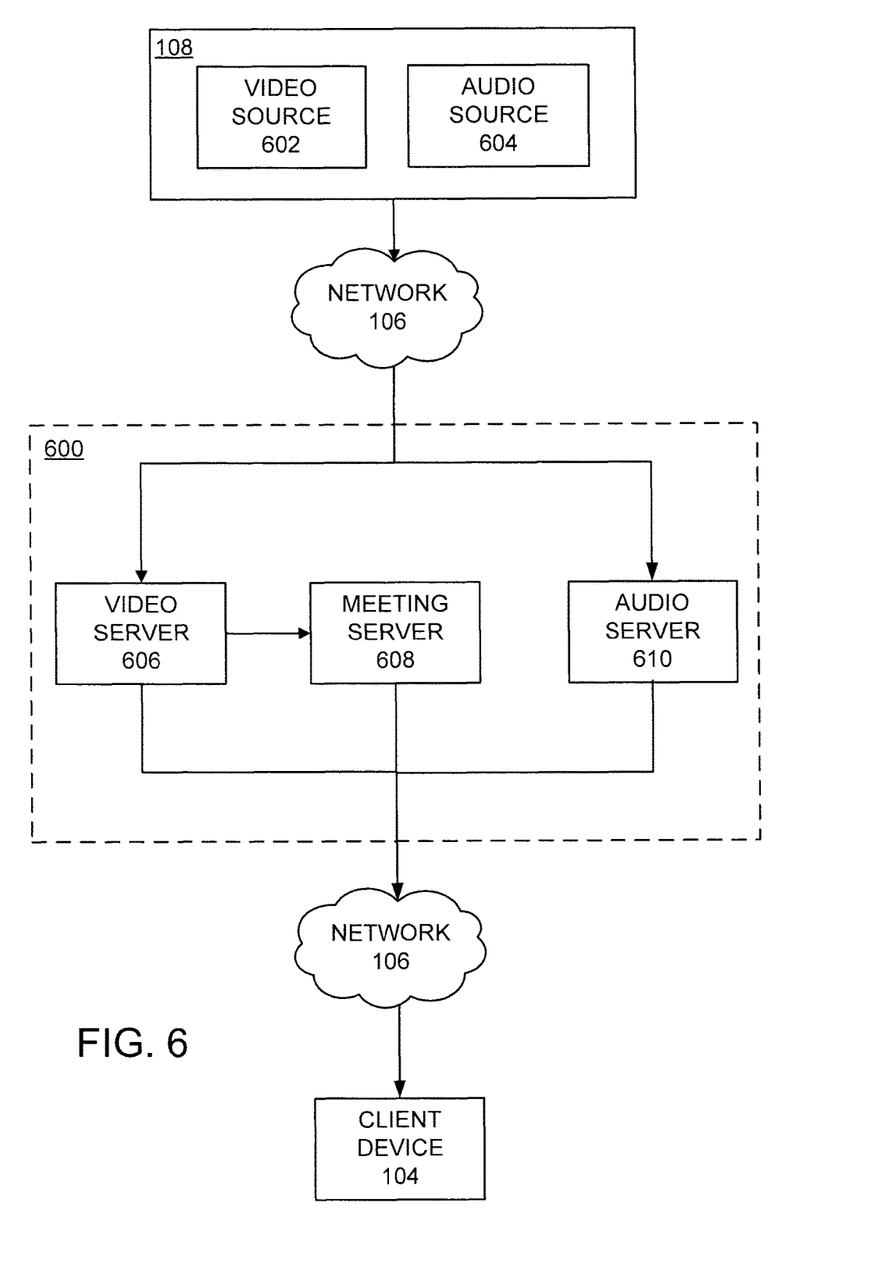
FIG. 6 illustrates an exemplary system according to one example.

FIG. 6 illustrates an exemplary system according to another embodiment. In FIG. 6, some items are similar to those previously described in other figures and therefore like designations are repeated. As illustrated in FIG. 6, an external server, such as a telecommunications server 108, is connected via the network 106 to a teleconferencing system 600 having a video server 606, meeting server 608 and audio server 610. The telecommunications server 108 contains one or more video sources 602 providing video of an online communication such as a telepresence stream along with corresponding audio from a one or more audio sources 604. The teleconferencing system 600 is further connected to the client device 104 via the network 106. In this embodiment, a plurality of servers having various functional capabilities enable the extracting of individual users from a group video feed to provide an updated communication session having a plurality of individual attendees. The methodology of how the teleconferencing system 600 provides these features and their corresponding advantages are described further herein with respect to FIG. 7.

Figure 7:
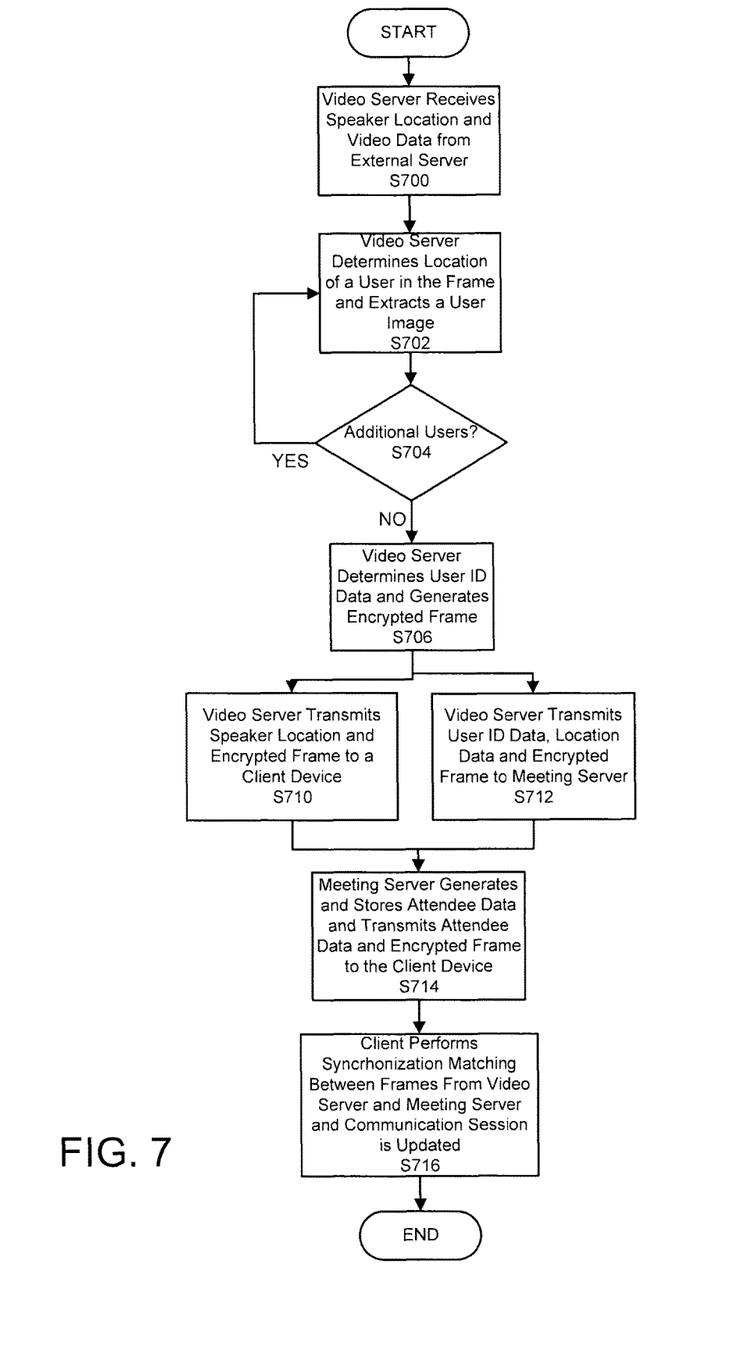
FIG. 7 illustrates an exemplary method for updating a communication session according to one example.

FIG. 7 illustrates an exemplary method for updating a communication session according to one example. At step S700, the video server 606 receives video stream data, such as a video frame, and speaker location information from the telecommunications server 108. As described previously herein, the video stream data may include a video frame having a plurality of attendees in the same frame such as when performing a telepresence meeting. Further, the speaker location identifies the location within the frame indicating which person is speaking. This can be obtained via signal processing by identifying the strength of the voice signal obtained by the one or more audio sources 604, the proximity of the signal to the one or more audio sources, and triangulation processing as would be understood by one of ordinary skill in the art.

At step S702, the video server 606 performs processing on the received video frame as described previously herein to extract a location of a user within the frame. Once a user is identified, part of or all of that user, such as the face, is extracted from the frame. The video server 606 then determines at step S704 if there are any other users within the frame utilizing similar processing techniques. If other users remain, the video server 606 locates and extracts additional users and repeats this process until every user within the video frame received from the telecommunications server 108 is identified. Once every user is identified and extracted, processing proceeds to step S706.

At step S706, the video server 606 determines identification information of each user by performing facial recognition processing as previously described herein. The video server 606 in selected embodiments includes an encryptor to encrypt the video frame received from the telecommunications server 108. The encryptor may be implemented via hardware or software. In selected embodiments, the video server 606 utilizes the message-digest algorithm (MD5) as a cryptographic hash function to encrypt the video frame. This produces a hash value of varying length, such as 128-bit (16-byte) which can be used to identify a particular video frame received by the video server 606. However, it is noted that other algorithms and encryption methods as would be understood by one of ordinary skill in the art can be used to encrypt the video frames received from the telecommunications server 108.

Once the video server 606 encrypts the video frame, the video server 606 transmits the encrypted video frame along with a speaker location to the client device 104 at step S712. The video server 606 also transmits at step S712 the user identification data determined with respect to each user extracted from the video frame, the location data of each user extracted from the video frame, and the encrypted video frame (having a same encrypted value as the encrypted video frame sent to the client device) to the meeting server 608.

Upon receiving the user identification information, the user location data and the encrypted video frame, the meeting server 608 at step S714 stores this information into an attendee database, such as an internal database or remote database 102, as attendee data or attendee meeting information. The meeting server 608 also stores identification information with respect to the encrypted video frame such as the hash value of the encrypted video frame. Therefore, referring back to FIG. 4, the attendee database contains a plurality of information about each attendee in the video frame such as an image of the attendee, a designated virtual location of the attendee such as a telepresence room or teleconferencing location, the name of the user, the location of the user within the frame, the address of the user, the frame value and the current speaker within the communication session.

Referring back to FIG. 7, once the meeting server 608 has stored the information received from the video server 606, the meeting server 608 at step S714 transmits at least a portion of the user attendee data received from the video server 606 for that particular frame as well as the encrypted frame to the client device 104. At this point, step S716, the client device 104 performs synchronization matching between the encrypted video frame received from the video server 606 and the encrypted video frame received from the meeting server 608. In other words, the client device performs comparison matching to identify that the encrypted video frame received from the video server 606 is the same as the encrypted video frame received from the meeting server 608. If not, processing is terminated until the client device receives two frames having the same encrypted hash value. If the encrypted frames do match, the client device determines that the video is synchronized thereby allowing the updating of the video information within the communication session.

To update the communication session, the client device 104 decrypts the encrypted video frame and extracts each attendee within the frame based on the location information contained in the user attendee data transmitted by the meeting server 608. The client device 104 can then display each attendee as a separate member of the communication session along with corresponding identification information received from the meeting server 608. Further, based on the speaker location information received from the video server 606, the client device 104 can determine based on the location of the attendees which attendee of the communication session is currently speaking. Based on this information, the location, size and/or priority of the video stream of the speaking user can be enhanced to clearly identify who is speaking within the communication session. The client device 104 also receives audio information from the audio server, as illustrated in FIG. 6, thereby providing the users of the client device 104 with audio from the various meeting attendees. Attendees can see who is speaking based on the speaker location information received from the meeting server 610 and displayed on the client device 104 as previously described herein.

In other selected embodiments, the teleconferencing system 600 itself may contain additional servers, which in addition to the functionality described above, may update the communication session internally within the teleconferencing system 600. For example, the video servers 606 and meeting server 608 may transmit their respective pieces of information to another internal server within the teleconferencing system 600 which then performs the above-noted video frame encryption matching to update the communication session. Once the communication session is updated, image and identification information of each attendee, and the layout of the video feed for each attendee based on the speaker location can be transmitted to the client device 104 such that the communication session is already updated on the teleconferencing system 600 without additional processing from the client device 104. Alternatively, the client device 104 could perform comparison matching of the received video frames to determine whether to accept the updated communication session information from the teleconferencing system 600.

The teleconferencing system 600, in selected embodiments, provides a variety of advantageous features in addition to those previously described herein with respect to the system server 100. By utilizing a video server 606 and meeting sever 608, the teleconferencing system can effectively divide the processing load between various servers to avoid video delay or update delay with respect to the communication session. For example, the video server 606 requires a high-performance CPU to handle the incoming video stream as well as processing of the frame data within the video stream. The meeting server 608, having no such requirements, can be separately provided to ensure that additional processing capabilities are not ascribed to the processing of the video server 606 as would be the case if one server were provided. An additional audio server 610 further helps reduce the load processed by the video server 606 to enhance response times and the overall user experience. Further, the encryption of the frame data and corresponding synchronization matching prevents issues when there may be a delay of the video frame arriving from either the video server 606 or meeting server 608 and further prevents video synchronization issues that could degrade the overall user experience. Additionally, as the attendee data is not as large as the video frame data, the attendee data may arrive to the client device 104 before the frame data. Therefore, it is beneficial that the client device 104 waits until it can perform comparison matching before updating the communication session.

Figure 8:
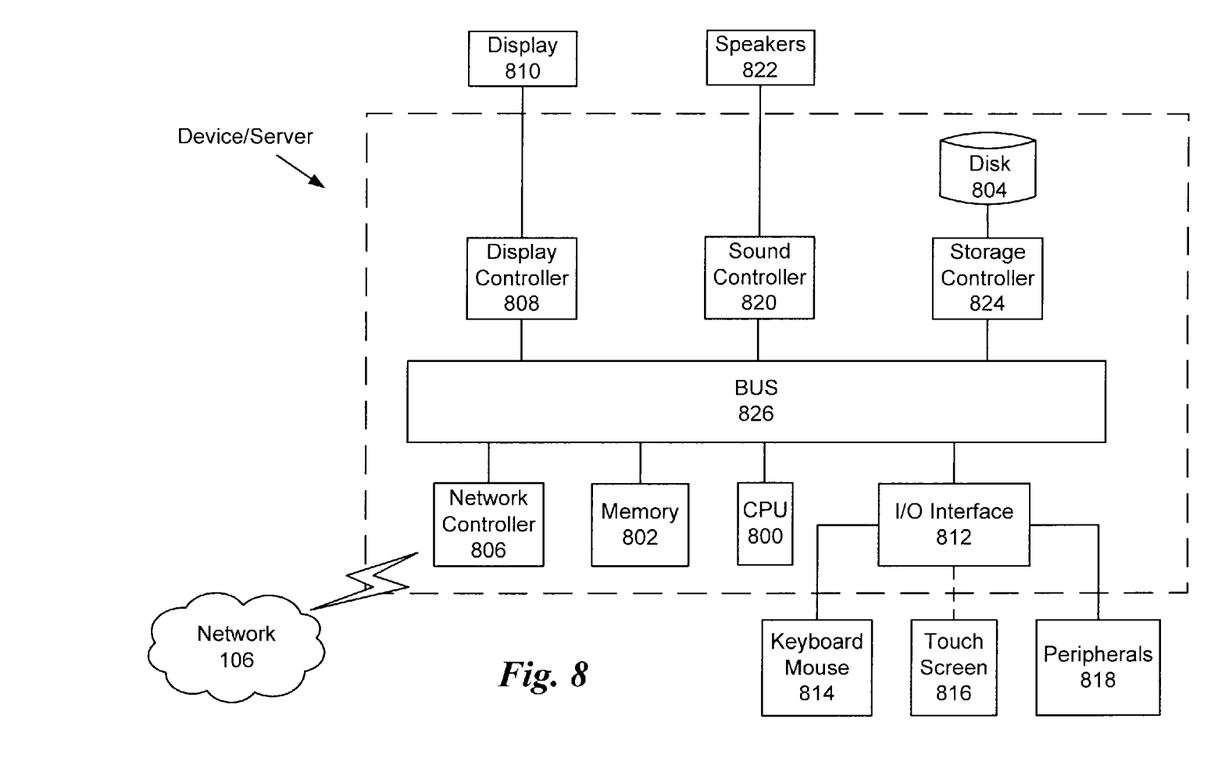
FIG. 8 illustrates an exemplary hardware configuration of the client device and/or one or more system servers according to one example

Next, a hardware description describing the servers 100, 606, 608 and 610 according to exemplary embodiments is described with reference to FIG. 8. In FIG. 8, the servers 100, 606, 608 and 610 include a CPU 800 which performs the processes described above. The process data and instructions may be stored in memory 802. These processes and instructions may also be stored on a storage medium disk 804 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the server communicates, such as another server or computer.

Further, the above-noted processes may be provided as a utility application, background daemon, or component of an operating system, or combination thereof, executing in conjunction with CPU 800 and an operating system such as Microsoft Windows 8, UNIX, Solaris, LINUX, Apple MAC-OS and other systems known to those skilled in the art. CPU 800 may be a Xenon or Core processor from Intel of America or an Opteron processor from AMD of America, or may be other processor types that would be recognized by one of ordinary skill in the art. Alternatively, the CPU 800 may be implemented on an FPGA, ASIC, PLD or using discrete logic circuits, as one of ordinary skill in the art would recognize. Further, CPU 800 may be implemented as multiple processors cooperatively working in parallel to perform the instructions of the inventive processes described above.

The servers 100, 606, 608 and 610 in FIG. 8 also includes a network controller 806, such as an Intel Ethernet PRO network interface card from Intel Corporation of America, for interfacing with network 106. As can be appreciated, the network 106 can be a public network, such as the Internet, or a private network such as an LAN or WAN network, or any combination thereof and can also include PSTN or ISDN sub-networks. The network 106 can also be wired, such as an Ethernet network, or can be wireless such as a cellular network including EDGE, 3G and 4G wireless cellular systems. The wireless network can also be WiFi, Bluetooth, or any other wireless form of communication that is known.

The servers 100, 606, 608 and 610 further includes a display controller 808, such as a NVIDIA GeForce GTX or Quadro graphics adaptor from NVIDIA Corporation of America for interfacing with display 810, such as a Hewlett Packard HPL2446w LCD monitor. A general purpose I/O interface 812 interfaces with a keyboard and/or mouse 814 as well as a touch screen panel 816 on or separate from display 810. General purpose I/O interface also connects to a variety of peripherals 818 including printers and scanners, such as an OfficeJet or DeskJet from Hewlett Packard.

A sound controller 820 is also provided in the servers 100, 606, 608 and 610, such as Sound Blaster X-Fi Titanium from Creative, to interface with speakers/microphone 822 thereby providing sounds and/or music. The speakers/microphone 822 can also be used to accept dictated words as commands for controlling the servers 100, 606, 608 and 610 or for providing location and/or property information with respect to the target property.

The general purpose storage controller 824 connects the storage medium disk X04 with communication bus 826, which may be an ISA, EISA, VESA, PCI, or similar, for interconnecting all of the components of the servers 100, 606, 608 and 610. A description of the general features and functionality of the display 810, keyboard and/or mouse 814, as well as the display controller 808, storage controller 824, network controller 806, sound controller 820, and general purpose I/O interface 812 is omitted herein for brevity as these features are known.

Any processes, descriptions or blocks in flow charts should be understood as representing modules, segments, portions of code which include one or more executable instructions for implementing specific logical functions or steps in the process, and alternate implementations are included within the scope of the exemplary embodiment of the present system in which functions may be executed out of order from that shown or discussed, including substantially concurrently or in reverse order, depending upon the functionality involved, as would be understood by those skilled in the art. Further, it is understood that any of these processes may be implemented as computer-readable instructions stored on computer-readable media for execution by a processor.

Obviously, numerous modifications and variations of the present system are possible in light of the above teachings. It is therefore to be understood that within the scope of the appended claims, the system may be practiced otherwise than as specifically described herein.

The invention claimed is:

1. A system for managing a teleconference session, the system comprising:
    at least one database;
    a first server having
        a first interface to receive a video frame from an external device, and
        a first processor programmed to
            encrypt the video frame,
            extract a plurality of user images from the encrypted video frame,
            calculate user information based on the one or more user images,
            transmit, to a client device, a first set of separate video feeds representing each of the plurality of user images extracted from the encrypted video frame via the first interface, and
            transmit the encrypted video frame, the extracted plurality of user images, and the user information to a second server via the first interface; and
    the second server having
        a second interface to receive the encrypted video frame, the extracted plurality of user images, and the user information from the first server, and
        a second processor programmed to
            generate user attendee data based on the user information,
            store the user attendee data in the at least one database, and
            transmit a second set of separate video feeds representing each of the plurality user images, the encrypted video frame, and at least a portion of the user attendee data to the client device via the second interface;
        wherein a communication session of the client device is updated based on the video frame and attendee data after performing synchronization matching between the encrypted video frame transmitted from the first server to the client device, and the encrypted video frame transmitted from the second server to the client device.

2. The system according to claim 1, wherein the video frame is received from a telepresence server and corresponds to a plurality of users in a single room.

3. The system according to claim 1, wherein the user attendee data includes in part locations of faces of extracted users within the encrypted video frame and corresponding user identification information.

4. The system according to claim 1, wherein the attendee data includes in part source location information of each user.

5. The system according to claim 1, wherein the communication session is updated by identifying the user images extracted from the encrypted video frame as separate attendees within the communication session.

6. The system according to claim 1, wherein each user is separately displayed within the communication session along with corresponding identification information.

7. The system according to claim 1, wherein, in response to a match between the two encrypted video frames, the communication session is updated based on the attendee data and the video frame.

8. The system according to claim 1, wherein the user attendee data includes in part speaker location information of a speaking user corresponding to the encrypted video frame.

9. A method for managing a teleconference session, the method comprising:
    receiving, at a first server of a system via a first interface, a video frame from an external device, wherein the video frame contains a plurality of users;
    encrypting, by the first server, the video frame;
    extracting, via a first processor of the first server, images for the plurality of users individually from the encrypted video frame;
    calculating, via the first processor of the first server, user information based on the one or more extracted user images;
    transmitting, by the first server, a first set of separate video feeds representing each of the plurality of user images extracted from the encrypted video frame to a client device via the first interface;
    transmitting, by the first server, the encrypted video frame, the plurality of user images, and the user information to a second server of the system via the first interface;
    generating, via a second processor of the second server, user attendee data based on the user information received from the first server;
    storing, via the second processor of the second server, the user attendee data in at least one database; and
    transmitting, by the second server, a second set of separate video feeds representing each of the extracted images, the encrypted video frame, and at least a portion of the user attendee data to the client device via a second interface of the second server,
    wherein a communication session of the client device is updated based on the video frame and attendee data after performing synchronization matching between the encrypted video frame transmitted from the first server to the client device, and the encrypted video frame transmitted from the second server to the client device.

10. The method according to claim 9, wherein the communication session is updated by identifying one or more users of the plurality of users from the video frame as separate attendees within the communication session.

11. The method according to claim 9, wherein, in response to a match between the two encrypted video frames, the communication session is updated based on the attendee data and the video frame.

12. The method according to claim 9, wherein the user attendee data includes in part speaker location information of a speaking user corresponding to the encrypted video frame.

13. A non-transitory computer-readable medium having computer-executable instructions thereon that when executed by a computer configured to manage a teleconferencing session causes the computer to execute a method comprising:
    receiving, at a first server of the computer via a first interface, a video frame from an external device;
    encrypting, by the first server, the video frame;
    extracting, by the first server, a plurality of images of users from the encrypted video frame;

calculating, by the first server, user information based on the one or more extracted user images;

transmitting, by the first server via the first interface, a first set of separate video feeds representing each of the plurality of user images extracted from the encrypted video frame to a client device via the first interface;

transmitting, by the first server, the encrypted video frame, the plurality of user images, and the user information to a second server of the computer via the first interface;

generating, by the second server, user attendee data based on the user information received from the first server;

storing, by the second server, the user attendee data in at least one database; and transmitting, by the second server, a second set of separate video feeds representing the plurality of extracted images of users, the encrypted video frame, and at least a portion of the user attendee data to the client device via a second interface of the second server, wherein a communication session of the client device is updated based on the video frame and attendee data after performing synchronization matching between the encrypted video frame transmitted from the first server to the client device, and the encrypted video frame transmitted from the second server to the client device.

14. The method according to claim 9, wherein the video frame depicts a plurality of users in a single room.

15. The method according to claim 9 further comprising:
identifying, via the processor, the location of each of the plurality of users within the encrypted video frame; and
identifying, via the processor, a set of coordinates for each of the plurality of users in the encrypted video frame from which to extract the individual images.

16. The non-transitory computer-readable medium of claim 13, wherein the video frame is received from a telepresence server and corresponds to a plurality of users in a single room.

17. The non-transitory computer-readable medium of claim 13, wherein the user attendee data includes in part locations of faces of extracted users within the encrypted video frame and corresponding user identification information.

* * * * *